US008102493B2

(12) United States Patent
Li et al.

(10) Patent No.: US 8,102,493 B2
(45) Date of Patent: Jan. 24, 2012

(54) MULTI-DOMAIN VERTICALLY ALIGNED LIQUID CRYSTAL DISPLAY

(75) Inventors: Wang-Yang Li, Tainan (TW); Che-Ming Hsu, Tainan (TW); Ying-Hao Hsu, Tainan (TW); Ming-Feng Hsieh, Tainan (TW); Chih-Yung Hsieh, Tainan (TW); I-Lin Ho, Tainan (TW)

(73) Assignee: Chimei Innolux Corporation, Miao-Li County (TW)

( * ) Notice: Subject to any disclaimer, the term of this patent is extended or adjusted under 35 U.S.C. 154(b) by 0 days.

(21) Appl. No.: 12/694,365

(22) Filed: Jan. 27, 2010

(65) Prior Publication Data

US 2010/0128213 A1    May 27, 2010

Related U.S. Application Data

(62) Division of application No. 11/261,944, filed on Oct. 28, 2005, now abandoned.

(30) Foreign Application Priority Data

Oct. 29, 2004  (TW) ............................ 93132909 A
Oct. 14, 2005  (TW) ............................ 94135843 A

(51) Int. Cl.
*G02F 1/1337*    (2006.01)
(52) U.S. Cl. ........................ 349/129; 349/130
(58) Field of Classification Search ........................ None
See application file for complete search history.

(56) References Cited

U.S. PATENT DOCUMENTS

| 6,724,359 | B2 |  | 4/2004 | Yamamoto |
| 6,801,284 | B2 | * | 10/2004 | Hattori et al. ............... 349/124 |
| 6,856,373 | B2 | * | 2/2005 | Sekido et al. ............... 349/181 |
| 7,158,201 | B2 |  | 1/2007 | Kim |
| 7,206,048 | B2 | * | 4/2007 | Song ........................... 349/129 |
| 7,821,603 | B2 | * | 10/2010 | Takeda et al. ............... 349/129 |
| 2002/0075437 | A1 |  | 6/2002 | Fukumoto |
| 2003/0011734 | A1 |  | 1/2003 | Liu |
| 2004/0041963 | A1 | * | 3/2004 | Ogishima et al. ........... 349/110 |
| 2004/0075798 | A1 | * | 4/2004 | Inoue et al. ................. 349/129 |
| 2004/0263738 | A1 |  | 12/2004 | Jin |

(Continued)

FOREIGN PATENT DOCUMENTS

CN    1687834    10/2005

(Continued)

OTHER PUBLICATIONS

Japanese Office Action, Patent Appl. No. 2005-311799 dated May 31, 2011 (including English translation) (4 pages).

*Primary Examiner* — Thanh-Nhan Nguyen
(74) *Attorney, Agent, or Firm* — Trop Pruner & Hu, P.C.

(57) ABSTRACT

A multi-domain vertically aligned liquid crystal display (MVA LCD) includes an active component array substrate, an opposite substrate, and a liquid crystal layer. The active component array substrate has a plurality of pixel units, and the liquid crystal layer is disposed between the active component array substrate and the opposite substrate. The liquid crystal layer proximal each pixel unit is divided into plural domain sets. Each domain set has plural domains.

14 Claims, 14 Drawing Sheets

U.S. PATENT DOCUMENTS

| | | |
|---|---|---|
| 2005/0036091 A1 | 2/2005 | Song |
| 2005/0122457 A1 | 6/2005 | Song |
| 2005/0213007 A1 | 9/2005 | Wu |
| 2006/0109406 A1* | 5/2006 | Sasabayashi et al. ......... 349/129 |
| 2007/0046877 A1 | 3/2007 | Lin |
| 2007/0046878 A1 | 3/2007 | Huang |

FOREIGN PATENT DOCUMENTS

| | | |
|---|---|---|
| JP | 2001215515 | 8/2001 |
| JP | 2004078157 | 3/2004 |
| JP | 2004213011 | 7/2004 |
| JP | 2004302267 | 10/2004 |
| TW | 552449 | 9/2003 |

* cited by examiner

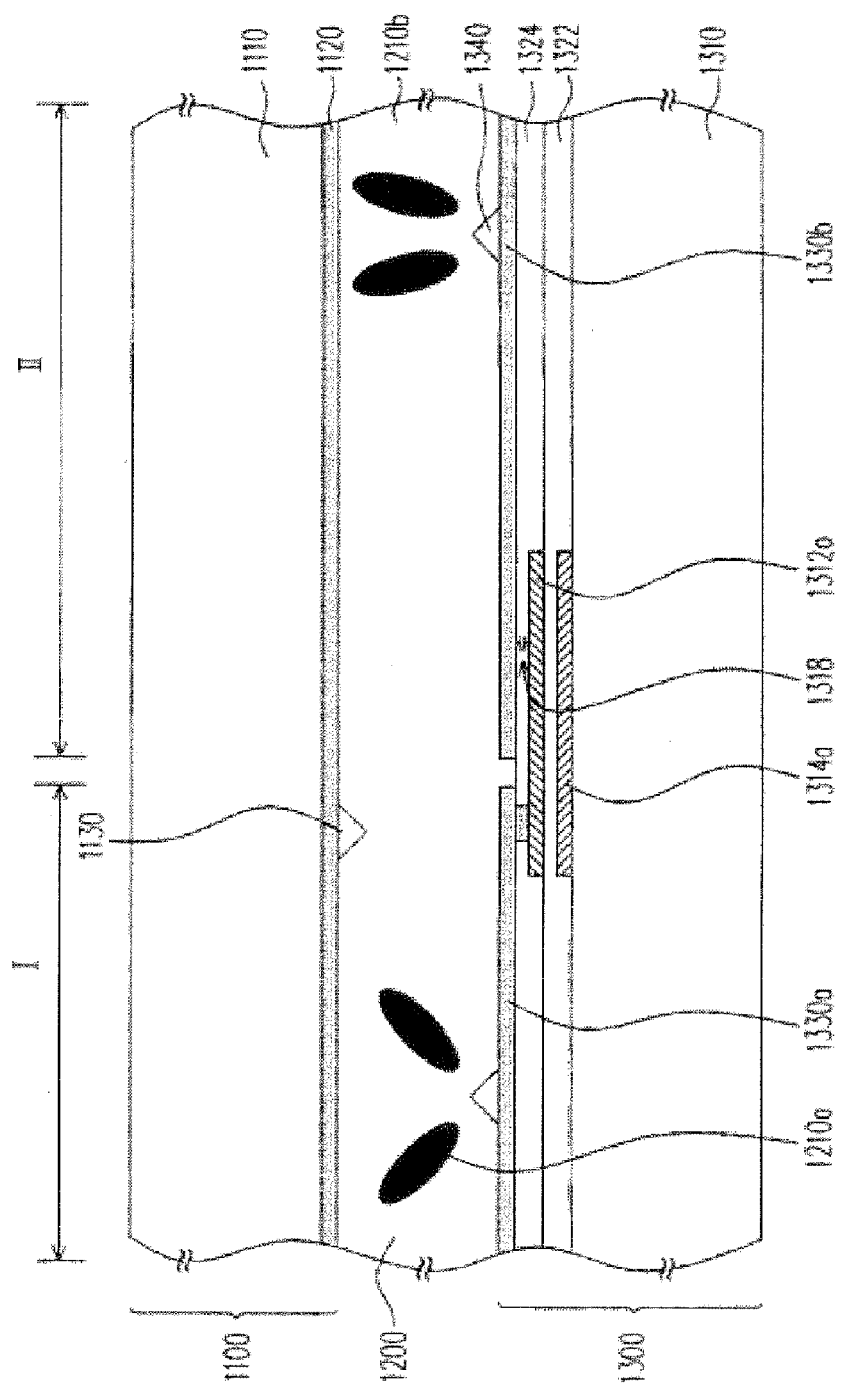

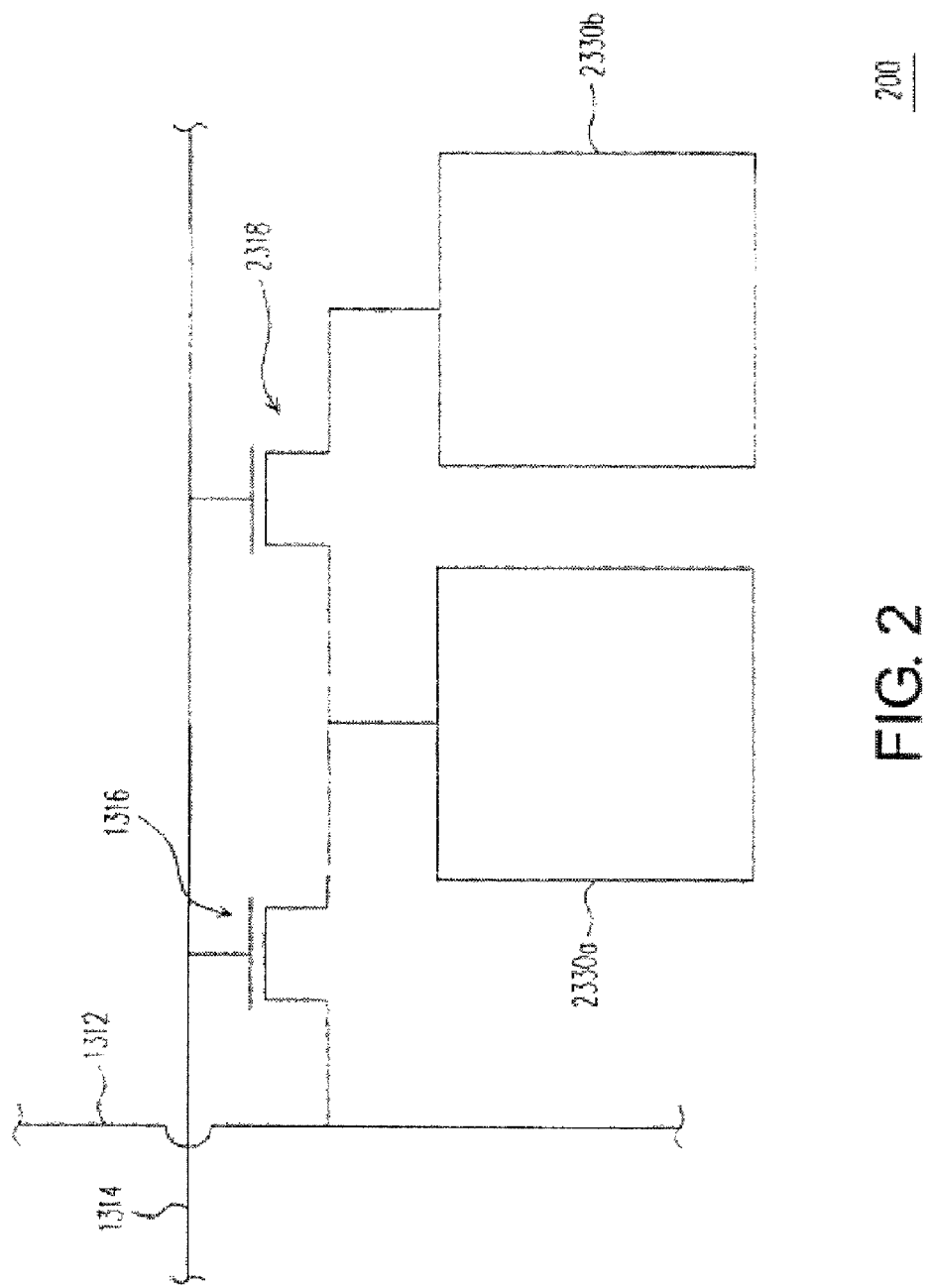

US 8,102,493 B2

MULTI-DOMAIN VERTICALLY ALIGNED LIQUID CRYSTAL DISPLAY

CROSS-REFERENCE TO RELATED APPLICATIONS

This is a divisional of U.S. Ser. No. 11/261,944, filed Oct. 28, 2005, now abandoned, which claims the benefit of Taiwan patent application No. 93132909, filed Oct. 29, 2004, and Taiwan patent application No. 94135843, filed Oct. 14, 2005, which are hereby incorporated by reference.

TECHNICAL FIELD

This invention relates to a display, more particularly to a multi-domain vertically aligned liquid crystal display.

BACKGROUND

The ever-increasing demand for displays has motivated display manufacturers to develop various types of displays. The cathode ray tube (CRT) display, in particular, has long dominated the display market. However, because of high power consumption and high radiation emission of CRT displays, other types of displays, such as the transistor liquid crystal display (TFT-LCD), have become more popular. TFT-LCDs have the advantages of providing high display quality, space efficiency, low power consumption, and no radiation emission.

Generally, LCDs exhibit high contrast ratio, no gray scale inversion, small color shift, high luminance, excellent color richness, high color saturation, quick response, and wide viewing angle. Example types of LCDs that are able to provide wide viewing angles include the following: twisted nematic LCDs with wide viewing film, in-plane switching (IPS) LCDs, fringe field switching LCDs, and multi-domain vertically aligned (MVA) LCDs.

MVA LCDs are able to have wide viewing angles due to provision of alignment protrusions and/or slits disposed on a color filter substrate or thin film transistor array substrate. The alignment protrusions and/or slits enable liquid crystal molecules of the LCD to align in various directions so that multiple alignment domains are achieved. However, with conventional MVA LCDs, when viewing angle changes, the brightness of the MVA LCD may change as well, leading to color shift and insufficient color saturation.

BRIEF DESCRIPTION OF THE DRAWINGS

FIG. 1A is a sectional view of a pixel unit of a multi-domain vertically aligned (MVA) liquid crystal display (LCD) according to a first embodiment.

FIG. 2 is a schematic circuit diagram of a pixel unit of an MVA LCD according to a second embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a multi-domain vertically aligned (MVA) LCD panel is provided that is able to reduce changes in brightness when the viewing angle changes. An MVA LCD panel can include an active component array substrate, an opposite substrate, and a liquid crystal layer, where the active component array substrate has a plurality of pixel units (arranged in an array of pixel units) and the liquid crystal layer is disposed between the active component array substrate and the opposite substrate. The liquid crystal layer proximal each pixel unit is divided into a plurality of domain sets, wherein each domain set has various domains and the effective voltage applied on the liquid crystal layer proximal each domain set is different.

To reduce changes in brightness of an MVA LCD when the viewing angle changes according to some embodiments, each of the pixel units of the active component array substrate is divided into multiple domain sets to achieve the objective of reducing brightness changes. For example, each pixel unit is divided into a first domain set and a second domain set, where both the first domain set and the second domain set include several domains (e.g., four domains, A, B, C, and D).

Conventionally, to drive an LCD panel, a driving voltage is input into the pixel electrode of each individual pixel unit via a data line so that the effective voltage supplied to the liquid crystal layer proximal the individual pixel unit is the same. Note, however, that according to some embodiments, in response to the same driving voltage input, the effective voltages supplied to portions of the liquid crystal layer proximal the domain sets are different. As the effective voltage supplied to the liquid crystal layer in each domain set is different, the transmittance of the liquid crystal layer in different domain sets is different so that the problem of steep change in brightness when the viewing angle changes is alleviated. The following describes embodiments that include mechanisms to cause the effective voltages supplied to portions of the liquid crystal layer in the plural domain sets to differ from each other.

First Embodiment

Figure 1B:
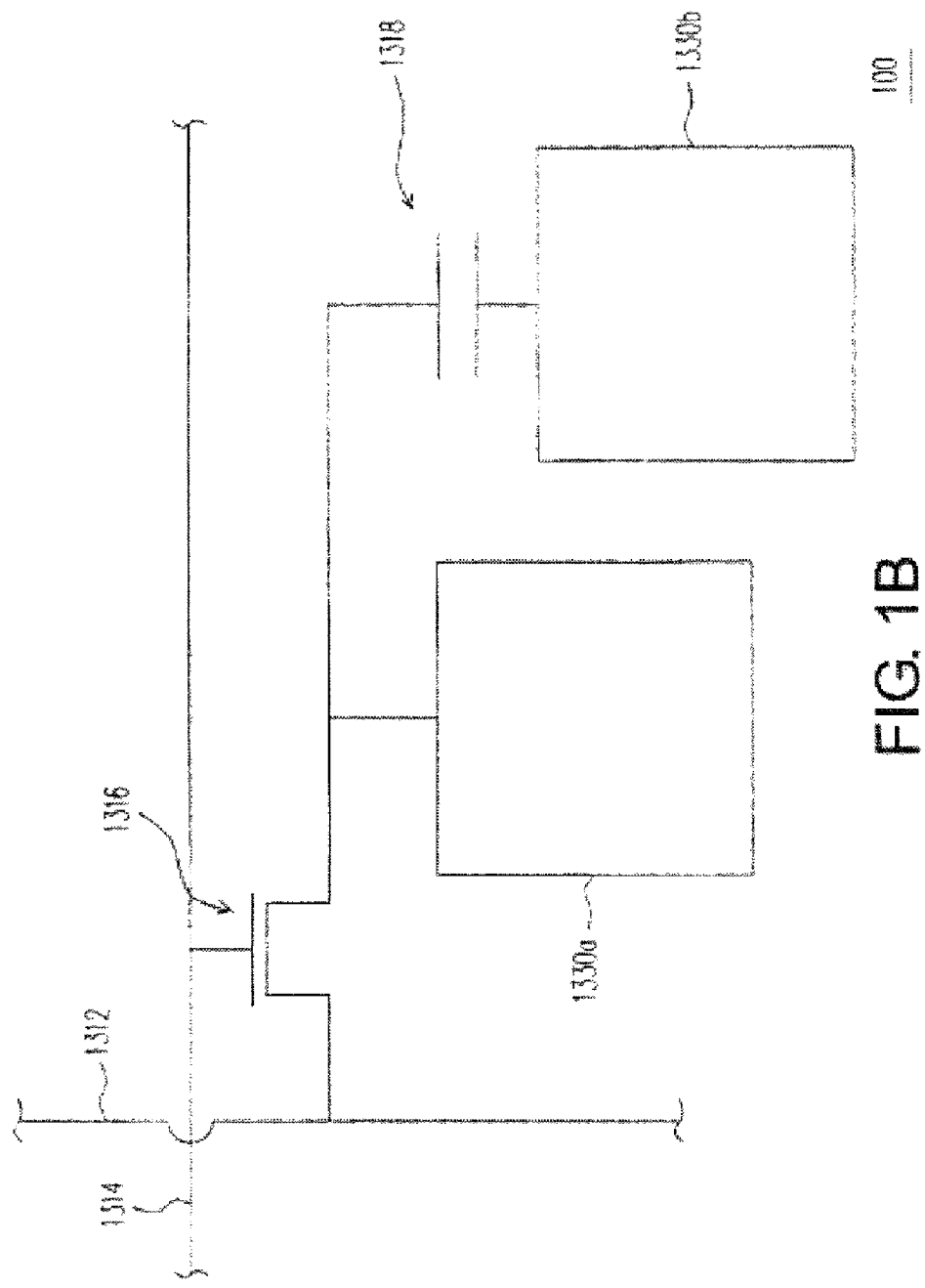
FIG. 1B is a schematic circuit diagram of the pixel unit of the first embodiment.

FIG. 1A is a sectional view of a pixel unit 100 of an MVA LCD according to a first embodiment, and FIG. 1B is a schematic circuit diagram of the pixel unit. The pixel unit depicted is repeated to provide an array of pixel units in the MVA LCD. The MVA LCD comprises an active component array substrate 1300, an opposite substrate 1100, and a liquid crystal layer 1200 portion disposed between the active component array substrate 1300 and the opposite substrate 1100. Additionally, the opposite substrate 1100 comprises a first substrate 1110 and a common electrode layer 1120 which is disposed on the surface of the first substrate 1110, where the common electrode layer 1120 faces the active component array substrate 1300.

The active component array substrate 1300 has a plurality of scan lines 1314, a plurality of data lines 1312, and a plurality of pixel units 100, where the pixel units 100 are controlled by the corresponding scan lines 1314 and data lines 1312 (as shown in FIG. 1B). Additionally, the pixel units 100 are disposed above a second substrate 1310 and comprise an active component 1316 (as shown in FIG. 1B), a first pixel electrode 1330a, a second pixel electrode 1330b, and a metal layer 1312a. The first and second pixel electrodes 1330a, 1330b are considered to be divided pixel electrodes provided to apply different voltages on portions of the liquid crystal layer 1200 in different first and second domain sets I and II. Furthermore, the active component 1316 is, for example, a thin film transistor (TFT) or otherwise a three-end active component. The metal layer 1312a and the data line 1312 are, for example, formed at the same time. The metal layer 1312a is electrically connected to the drain of the TFT 1316, and the data line 1312 is connected to the source of the TFT 1316. Note that the terms "source" and "drain" can be used interchangeably. The gate of the TFT 1316 is connected to a scan line 1314.

The active component 1316 is disposed on the second substrate 1310, and an insulation layer 1322 extends from the active component and covers the second substrate 1310, wherein the insulation layer is, for example, a gate insulation layer. Additionally, the metal layer 1312a is disposed above the insulation layer 1322, and the insulation layer 1324 covers the metal layer 1312a and insulation 1322, wherein the insulation layer 1324 is, for example, a protection layer. In one embodiment, the metal layer 1312a is in a location which, for example, overlaps that of a shared line 1314a. In other words, the metal layer 1312a is above the shared line 1314a.

Note that the first pixel electrode 1330a and the second pixel electrode 1330b are separately disposed (and spaced apart from each other horizontally) above the insulation layer 1324, wherein the first pixel electrode 1330a electrically connects to the active component 1316 and is in a location that corresponds to that of a first domain set I. Additionally, the second pixel electrode 1330b is coupled to the metal layer 1312a to form a capacitance 1318, and is in a location that corresponds to that of a second domain set II. Both the first domain set I and the second domain set II include multiple domains, such as four domains with different liquid crystal alignment. The overlapping area of the second pixel electrode 1330b and the metal layer 1312a defines the capacitor 1318 and will determine the effective voltage applied on the portion of the liquid crystal layer 1200 proximal the second pixel electrode 1330b. A liquid crystal layer portion "proximal" a pixel electrode means that the liquid crystal layer is in the vicinity of the pixel electrode such that the liquid crystal layer portion will be electrically affected by the pixel electrode.

In each pixel unit 100, the first pixel electrode has a direct electrical connection with the active component 1316, while the second pixel electrode 1330b electrically couples to the active component 1316 via the capacitance 1318. Such an arrangement results in the voltage applied on the second pixel electrode 1330b being different from that applied on the first pixel electrode, so that the effective voltage applied on the liquid crystal layer 1200 portion in the first domain set I is different from that applied on the liquid crystal layer 1200 portion in the second domain set II. When a particular driving voltage is input into the pixel unit via the data line 1312, the first pixel electrode 1330a will receive a higher voltage than the second pixel electrode 1330b so that the effective voltage applied on the liquid crystal molecules 1210a in the first domain set I is greater than that applied on the liquid crystal molecules 1210b in the second domain set II, resulting in an obliquity of the liquid crystal molecules of the first domain set I different from that of the liquid crystal modules of the second domain set II, so that when the viewing angle changes, changes in brightness will be reduced because the first domain set I and the second domain set II will compensate each other in brightness.

Note that in this embodiment, a plurality of alignment protrusions 1130 are disposed on the common electrode layer 1120 of the opposite substrate 1100, and a plurality of alignment protrusions 1340 are disposed on the second pixel electrode 1330b and the first pixel electrode 1330a of the active component arrays substrate 1300 so that the liquid crystal molecules within the liquid crystal layer 1200 portion will be arranged in multi-domain pattern.

However, in another embodiment, the method by which the liquid crystal molecules within the liquid crystal layer 1200 portion are caused to be arranged in multi-domain pattern is, for example, to form slits on the common electrode layer 1120, the first pixel electrode 1330a and the second pixel electrode 1330b. In another embodiment, the method by which the liquid crystal molecules within the liquid crystal layer 1200 portion are caused to be arranged in multi-domain pattern is, for example, to form either one of alignment protrusions and slits on the common electrode layer 1120a and form the other one of alignment protrusions and slits on the first pixel electrode 1330a and the second pixel electrode 1330b.

Second Embodiment

FIG. 2 is a schematic circuit diagram of a pixel unit 200 in an MVA LCD according to a second embodiment. The arrangement FIG. 2 is similar to that of FIG. 1B with the difference being that in the pixel unit 200 of the second embodiment, the second pixel electrode 2330b electrically connects to the active component 1316 through a resistance component 2318. Note that the resistance component 2318 is a transistor but it can also be a resistor or any other device capable of generating a voltage drop. Additionally, the first pixel electrode 2330a electrically connects to the active component 1316 directly. The gate of the component 2318 (if implemented as a transistor) is connected to the same scan line 1314 as the gate of the active component 1316.

The first pixel electrode 2330a corresponds to the location of the first domain set I and the second pixel electrode 2330b corresponds to the location of the second domain set II, so that the effective voltages applied on the liquid crystal layer 1200 portion in the first domain set I and that applied on the liquid crystal layer 1200 portion in the second domain set II are different (similar to what is illustrated in FIG. 1A). The voltage drop generated by resistance component 2318 will determine the effective voltage applied to the liquid crystal layer 1200 portion in the second domain set II (similar to what is illustrated in FIG. 1A).

In summary, it can be seen from the first and the second embodiments that the first pixel electrode corresponds to the location of the first domain set and the second pixel electrode corresponds to the location of the second domain set. Additionally, the first pixel electrode electrically connects to the active component directly while the second pixel electrode connects to the active component via a capacitance or a resistance component so that the effective voltage applied to the liquid crystal layer in the first domain set and that applied to the liquid crystal layer in the second domain set are different. In other implementations, instead of defining just two domain sets, additional domain sets can also be defined.

A First Variant of the Second Embodiment

Figure 2A:
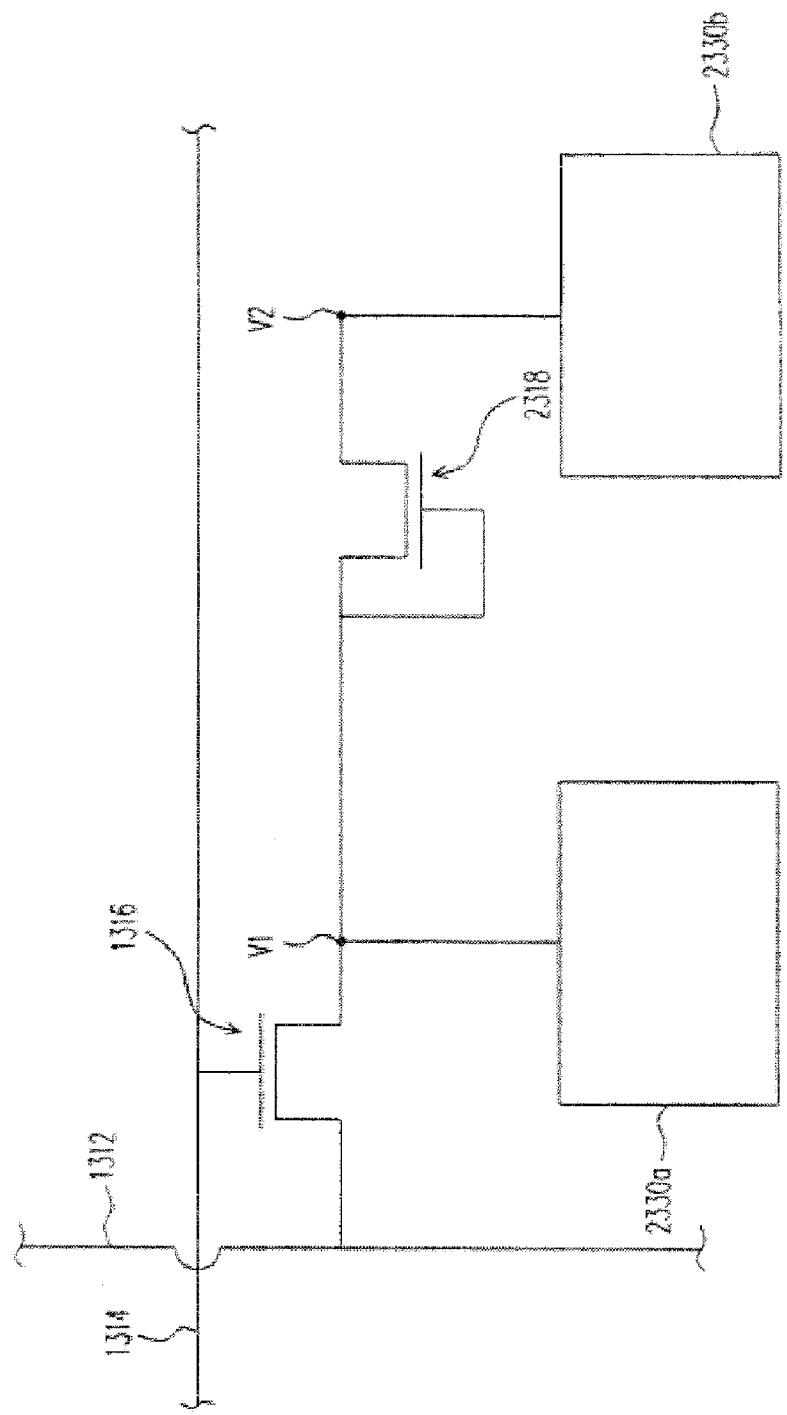
FIG. 2A is a schematic circuit diagram of a pixel unit according to another embodiment.

FIG. 2A is a schematic circuit diagram of a pixel unit in an MVA LCD according to a variation of the second embodiment. This pixel unit is similar to the second embodiment with the main difference being the way in which the gate of transistor 2318 is connected. In FIG. 2A, the gate of transistor 2318 electrically connects to the source of the active component 1316 (rather than to scan line 1314 as in FIG. 2). This will cause a voltage on the data line 1312 to turn on the transistor 2318 so that an input voltage signal can be provided to the pixel electrode 2330b once the scan line 1314 turns on the active component 1316.

Note that the voltage signal output from data line 1312 may vary from one time frame to another time frame, which causes the channel size of the transistor 2318 to change with the varying voltage signal. Therefore, the transistor 2318 provides a variable resistance. This variable resistance will generate a voltage drop that can cause the voltage received by the first pixel electrode 2330a (located in the first domain set I) to be different from that received by the second pixel electrode 2330b (located in the second domain set II). In other words, the effective voltage applied on the liquid crystal layer in the first domain set I is different from that applied on the liquid crystal layer in the second domain set II.

A Second Variant of the Second Embodiment

Figure 2B:
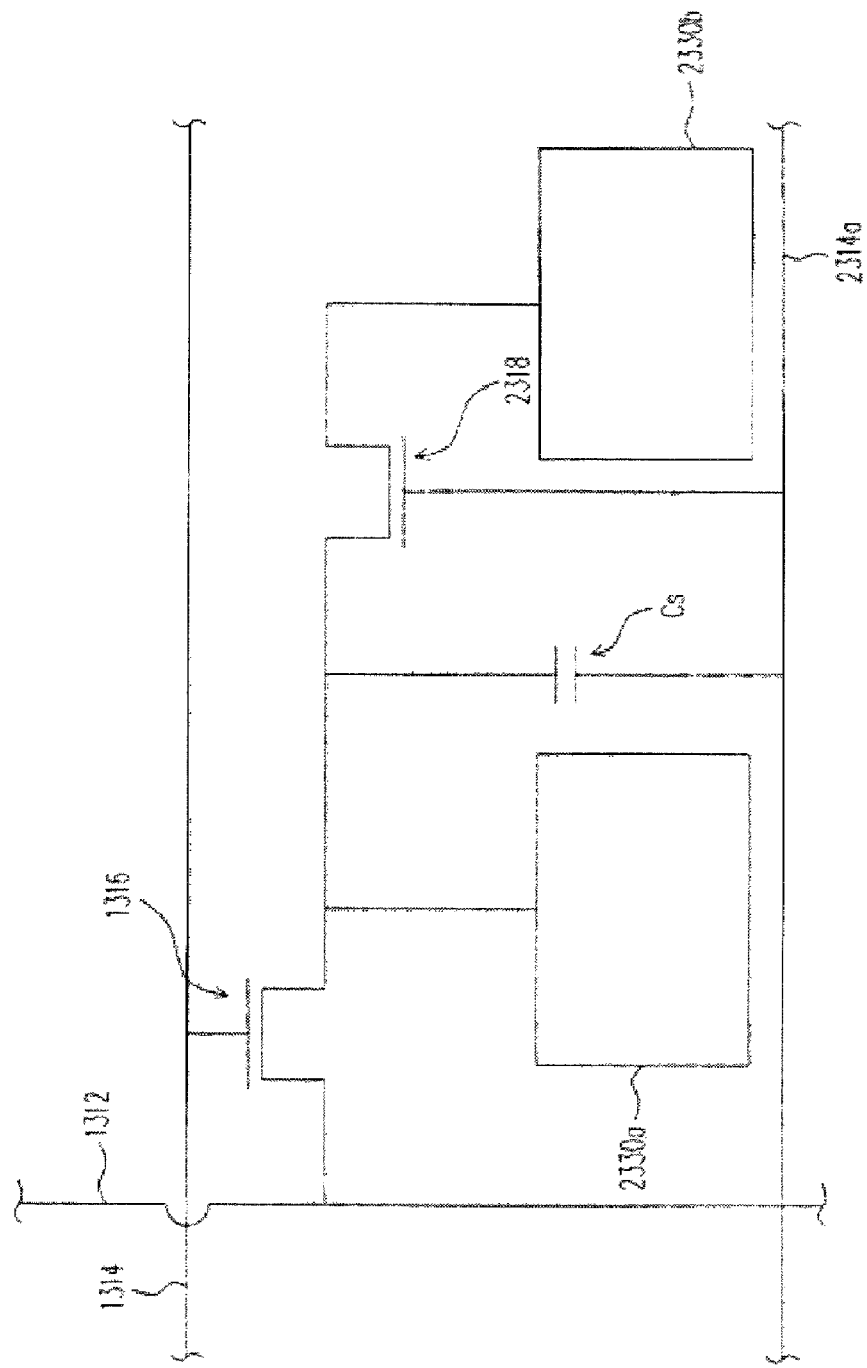
FIG. 2B is a schematic circuit diagram of a pixel unit according to yet another embodiment.

FIG. 2B is a schematic circuit diagram of a pixel unit in an MVA LCD according to a second variant of the second embodiment. This pixel unit is similar to the second embodiment with the main difference being that in this second variant, the pixel unit further includes a shared line 2314a which electrically connects to the gate of the transistor 2318. Generally, the shared line 2314a may electrically connect to a reference voltage source so that the transistor 2318 will stay in the on state. The transistor 2318 provides a resistance and it is this resistance that enables this second variant to generate a voltage drop so that the voltage received by the first pixel electrode 2330a (located in the first domain set) is different from that received by the second pixel electrode 2330b (located in the second domain set II).

Additionally, the pixel unit of this second variant may further include a storage capacitor, Cs, which electrically connects the shared line 2314a and the first active component 1316. This storage capacitor Cs can be located inside the first domain set I or the second domain set II, or alternatively, be located inside both the first domain set I and the second domain set II.

Third Embodiment

Figure 3:
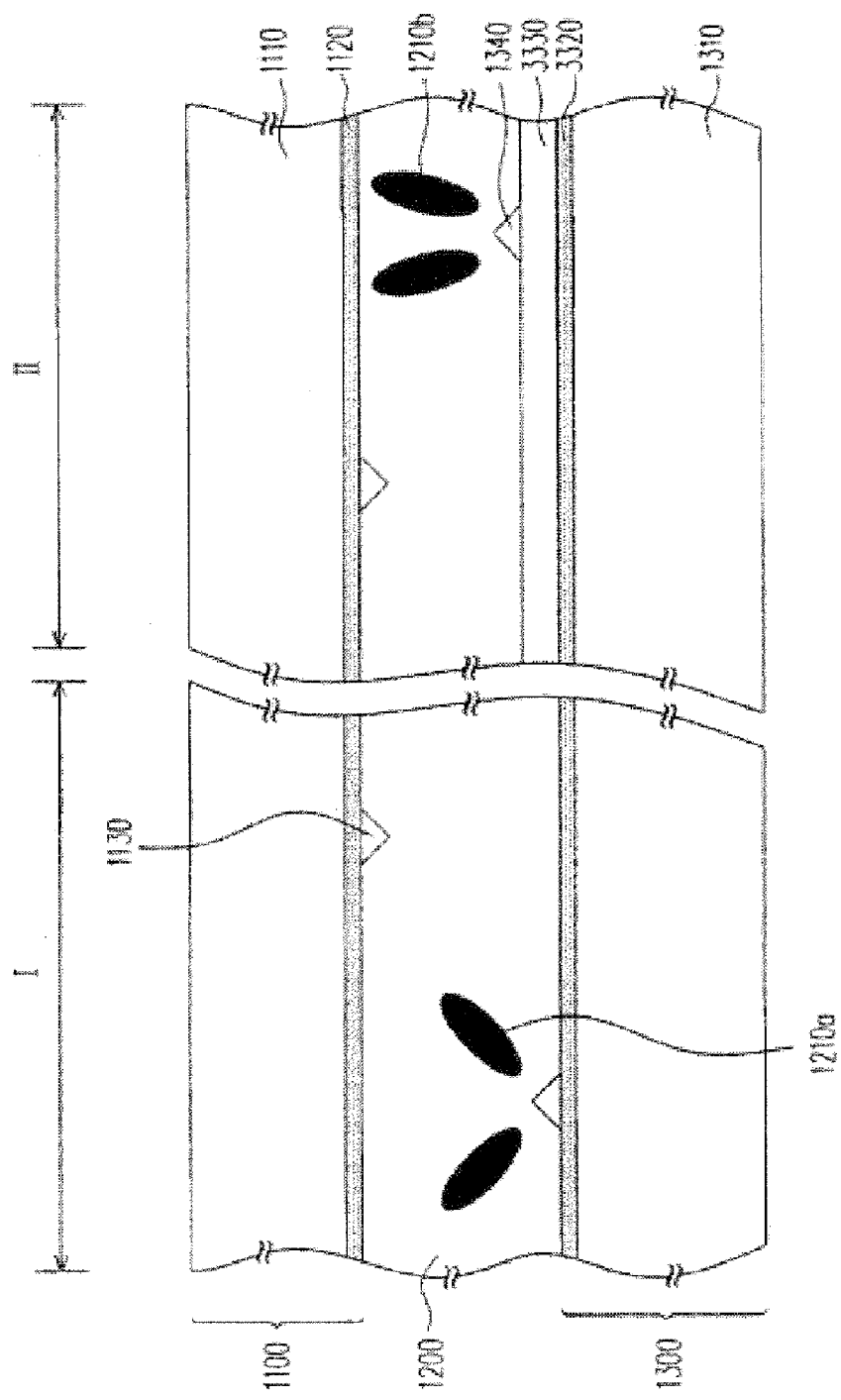
FIG. 3 is a sectional view of a pixel unit of an MVA LCD according to a third embodiment.

FIG. 3 is a sectional view of a pixel unit of a third embodiment. The third embodiment is similar to the first embodiment with the difference being that the pixel electrode 3320 of the third embodiment is not divided and a dielectric layer 3330 is disposed above the pixel electrode 3320 that corresponds to the location of the second domain set II. Such a dielectric layer is not provided in the first domain set I. The dielectric layer 3330 provides a dielectric constant between the pixel electrode 3320 and the liquid crystal layer 1200 portion in the second domain set II that is higher than the dielectric constant between the pixel electrode 3320 and the liquid crystal layer 1200 portion in the first domain set I, so that the effective voltage applied to the liquid crystal layer 1200 portion in the second domain set II is different from that applied on the liquid crystal layer 1200 portion in the first domain set I.

The dielectric layer 3330 can be made of, for example, resin or another dielectric material and it is also electrically connected to the active component. The dielectric constant and thickness of the dielectric layer 3330 will determine the effective voltage applied to the liquid crystal layer 1200 portion in the second domain set II.

Note that this embodiment is not limited to use of the alignment protrusions 1130 and 1340 in order to cause the liquid crystal molecules within the liquid crystal layer 1200 portion to be arranged in a multi-domain pattern. Another method by which the liquid crystal molecules within the liquid crystal layer 1200 portion are caused to arrange in multi-domain pattern is, for example, to form slits on both the active component array substrate 1300 and the opposite substrate 1100 at the same time. In another embodiment, alignment protrusions and slits are formed on the active component array substrate 1300 and the opposite substrate 110.

Fourth Embodiment

Figure 4:
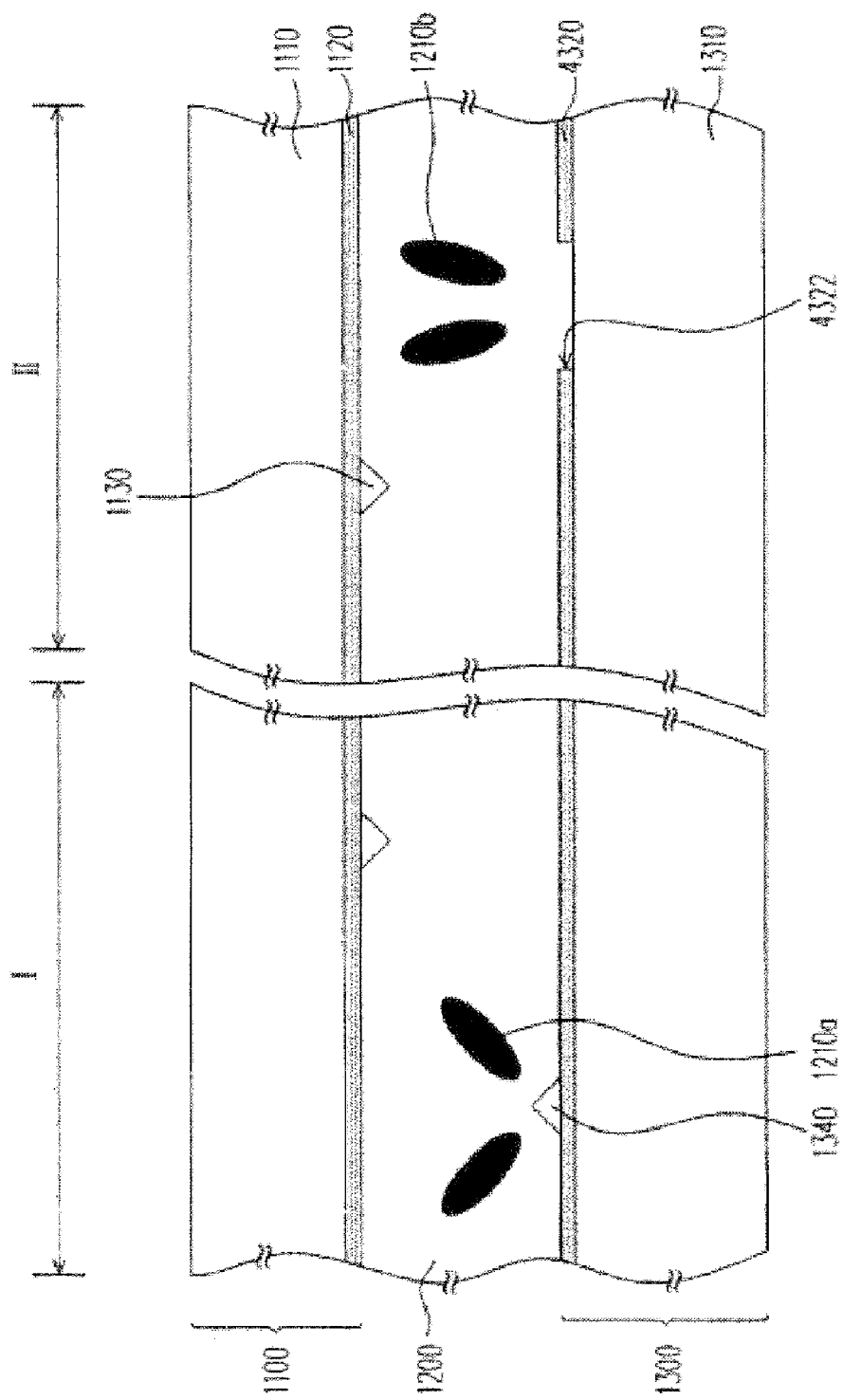
FIG. 4 is a sectional view of a pixel unit of an MVA LCD according to a fourth embodiment.

FIG. 4 is a sectional view of a pixel unit in an MVA LCD according to a fourth embodiment. The fourth embodiment is similar to the third embodiment with the difference being that the pixel electrode 4320 has a plurality of slits 4322 and these slits 4322 are at a location that corresponds to that of the second domain set II. Additionally, the pixel electrode 4320 is also provided with alignment protrusions 1340 and the alignment protrusions 1340 are at a location that corresponds to that of the first domain set I. In other words, in this embodiment, the protrusions 1340 and slits 4322 are both formed on the active component array substrate 1300 so that the driving voltage applied to the liquid crystal layer 1200 portion in the first domain set I has a different characteristic as compared to the driving voltage applied on the liquid crystal layer 1200 portion in the second domain set II, such that the first domain set I and the second domain set II will have different obliquities of liquid crystal molecules even with the same voltage input. This enables the two domain sets to compensate for the difference in brightness caused by changes in the viewing angle so that the problem of color drift is alleviated.

Note that in this embodiment, slits and alignment protrusions 1130 may also be formed on the opposite substrate 1100 while the alignment protrusions 1340 are formed on the active component array substrate 1300 so that the driving voltage applied to the liquid crystal layer 1200 portion in the first domain set I has a different characteristic as compared to the driving voltage applied on the liquid crystal layer 1200 portion in the second domain set II. Furthermore, in this embodiment, the alignment protrusions 1340, 1130, and slits 4322 combined will cause the liquid crystal molecules within the liquid crystal layer 1200 portion to be arranged in a multi-domain pattern. However, the method by which the liquid crystal molecules are caused to be arranged in multi-domain pattern is not limited to this kind of combination. For example, the alignment protrusions 1130 may be substituted by slits formed on the common electrode layer 1120 of the opposite substrate.

Fifth Embodiment

Figure 5A:
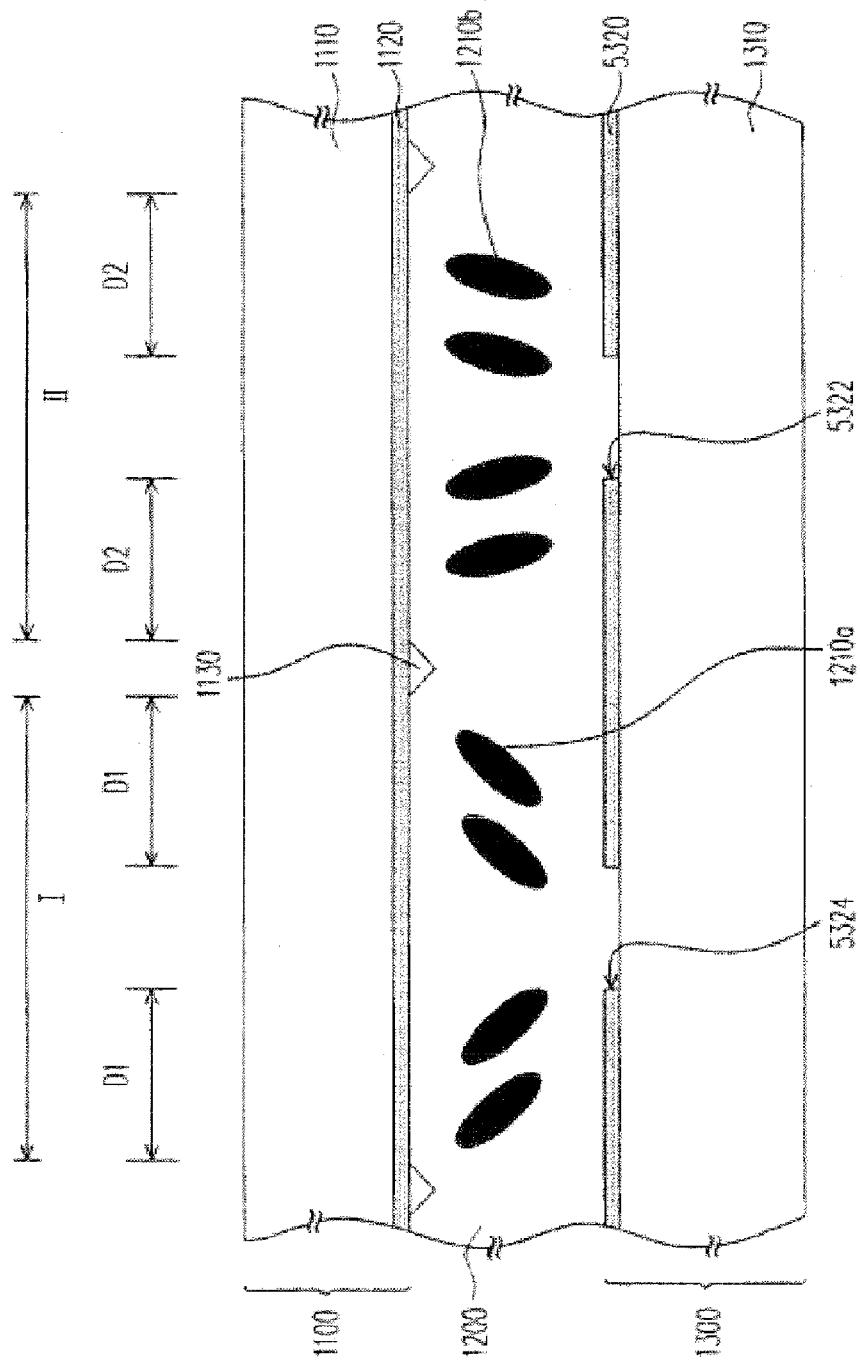
FIG. 5A is a sectional view of a pixel unit of an MVA LCD according to a fifth embodiment.
Figure 5B:
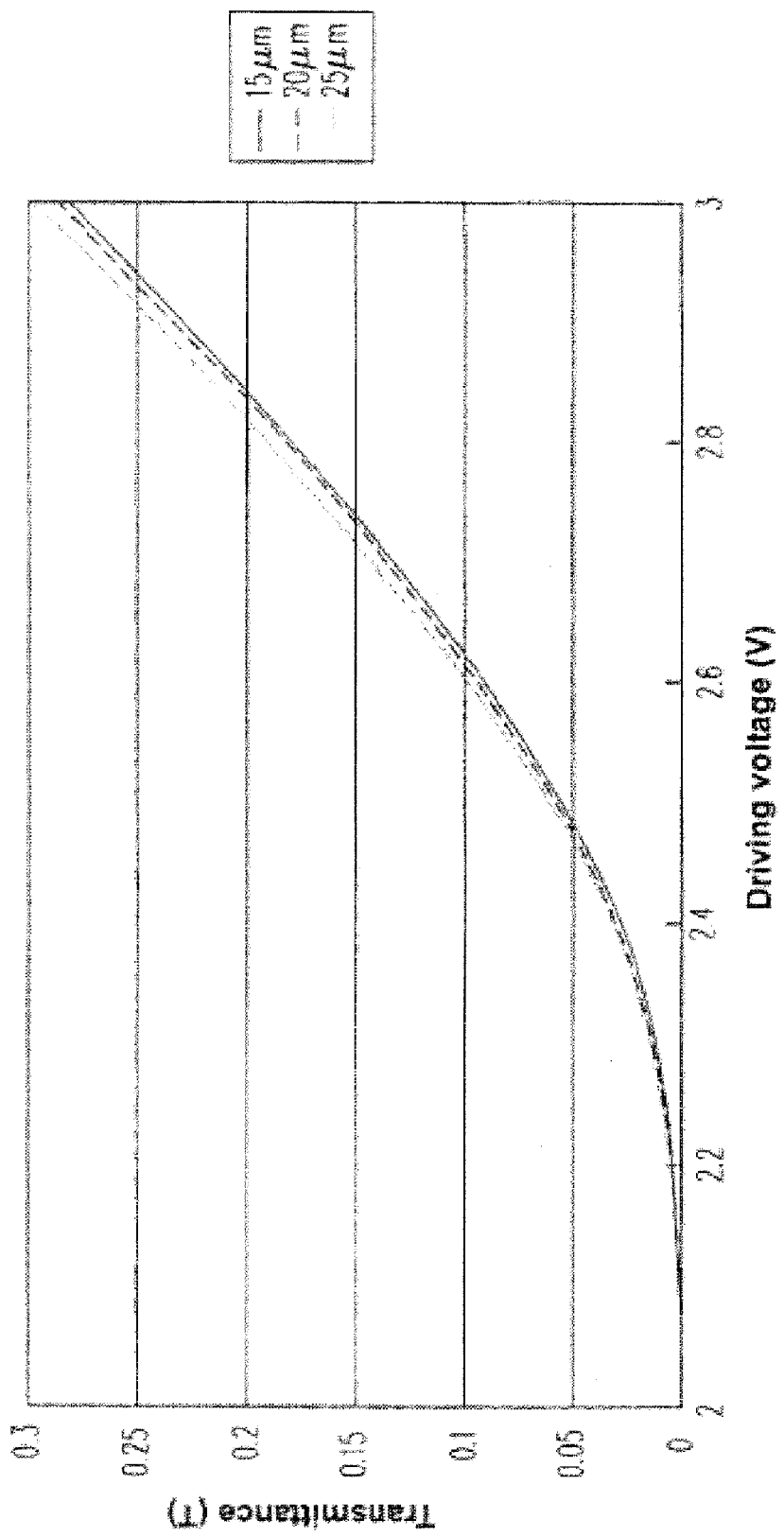
FIG. 5B is a chart of curves representing relationships of voltage to transmittance.

FIG. 5A is a sectional view of a pixel unit in an MVA LCD according to a fifth embodiment, and FIG. 5B is a chart of curves (for different distances) showing the relationship of driving voltage versus transmittance. The pixel electrode 5320 has a plurality of slits 5322 and 5324 and electrically connects to the active component. Additionally, the opposite substrate 1100 is provided with a plurality of alignment protrusions 1130 and the combination of the alignment protrusions 1130, slits 5322 and 5324 will cause the liquid crystal molecules within the liquid crystal layer 1200 portion to arrange in a multi-domain pattern.

Each alignment protrusion 1130 is separated by a minimum first distance D1 and a minimum second distance D2 from slit 5324 and slit 5322, respectively, on the two sides, respectively, of the protrusion 1130. The first distance D1 is different from (e.g., greater than) the second distance D2. Additionally, the space between each alignment protrusion 1130 and the slit 5324 is in the first domain set I, and the space between the alignment protrusion 1130 and the slit 5322 is in the second domain set II.

As the alignment protrusion 1130 has different minimum distances from slits 5324 and 5322, the liquid crystal molecules 1210a and 1210b in the first and second domain sets, respectively, will have different rotation angles when subjected to the action of an electrical field so that different transmittances are generated even with the same voltage input.

In FIG. 5B, the horizontal axis represents the driving voltage, and the vertical axis represents the transmittance. Example distances for D1, D2 represented in FIG. 5B are 15 µm (micron) (solid line), 20 µm (dashed line), and 25 µm (dotted line). Note that by X µm it is meant that both the first distance D1 and the second distance D2 are X µm.

It can be seen from FIG. 5B that the wider the distance the higher the transmittance if the driving voltage is kept unchanged. In other words, when the first distance D1 is provided with the second distance D2 as a pair (such as in the arrangement of FIG. 5A), the liquid crystal molecules at the location of the first domain set I and that at the location of the second domain set II will have different rotation angles when both are subjected to the action of the same electrical field. In other words, the driving voltage applied to the liquid crystal layer 1200 portion in the first domain set I and that applied on the liquid crystal layer 1200 portion in the second domain set II will have different characteristics. The higher the difference between the first distance D1 and the second distance D2, the greater the difference between their driving voltage—transmittance curves. In some examples, the distance difference is greater than or equal to one µm. In other examples, the distance difference is greater than or equal to 10 µm.

In the embodiment of FIG. 5A, the opposite substrate 1100 is provided with first alignment structures (alignment protrusions 1130) and the active component array substrate 1300 is provided with the second alignment structures (slits 5324 and 5322) so that the liquid crystal molecules within the liquid crystal layer 1200 portion are arranged in a multi-domain pattern.

Alternatively, a different arrangement of the FIG. 5A embodiment can be used. For example, the first alignment structures can include slits and the second alignment structures can include slits 5324 and 5322. Alternatively, the first alignment structures can include alignment protrusions 1130, and the second alignment structures can include alignment protrusions. In yet another arrangement, the first alignment structures can include slits and the second alignment structures can include alignment protrusions.

Sixth Embodiment

Figure 6A:
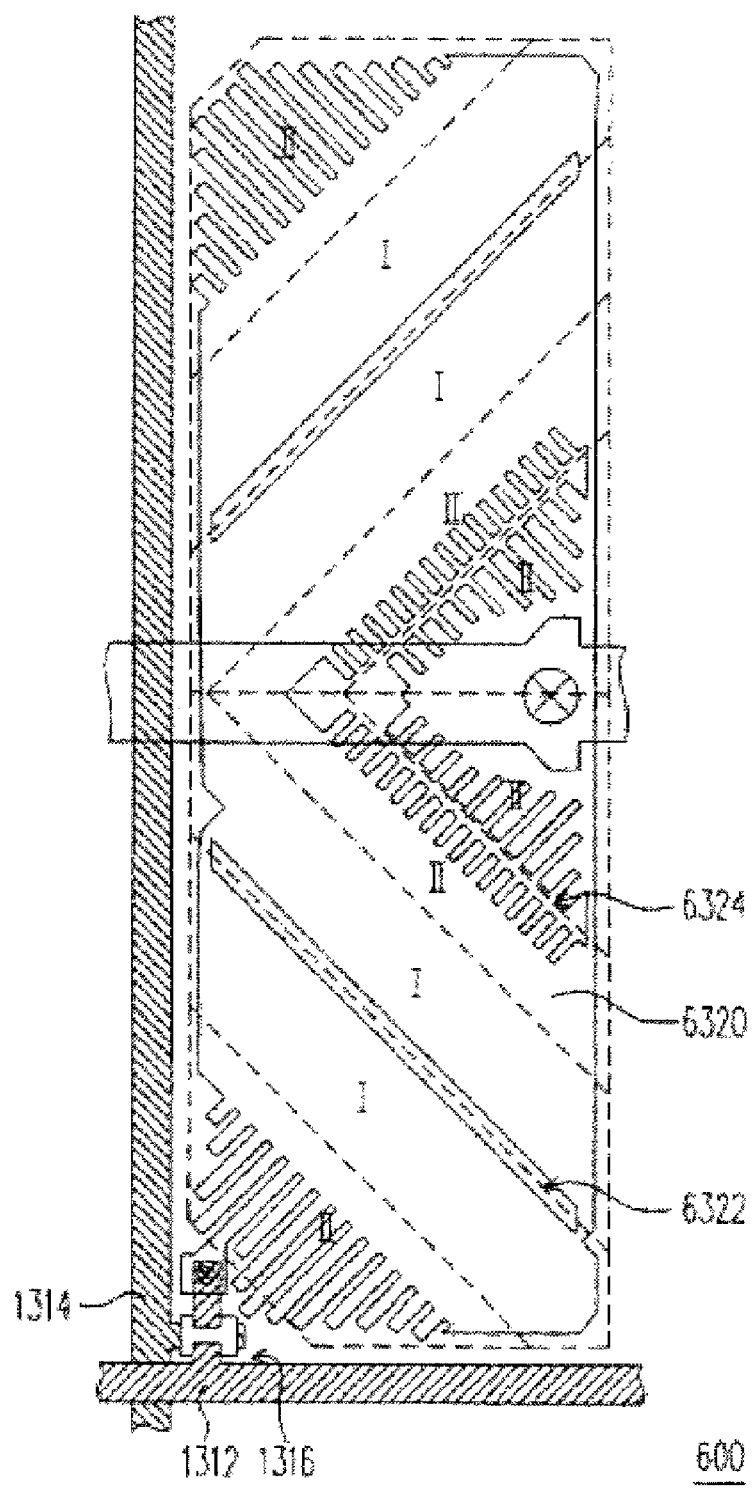
FIG. 6A is a schematic top view of a pixel unit of an MVA LCD according to a sixth embodiment.
Figure 6B:
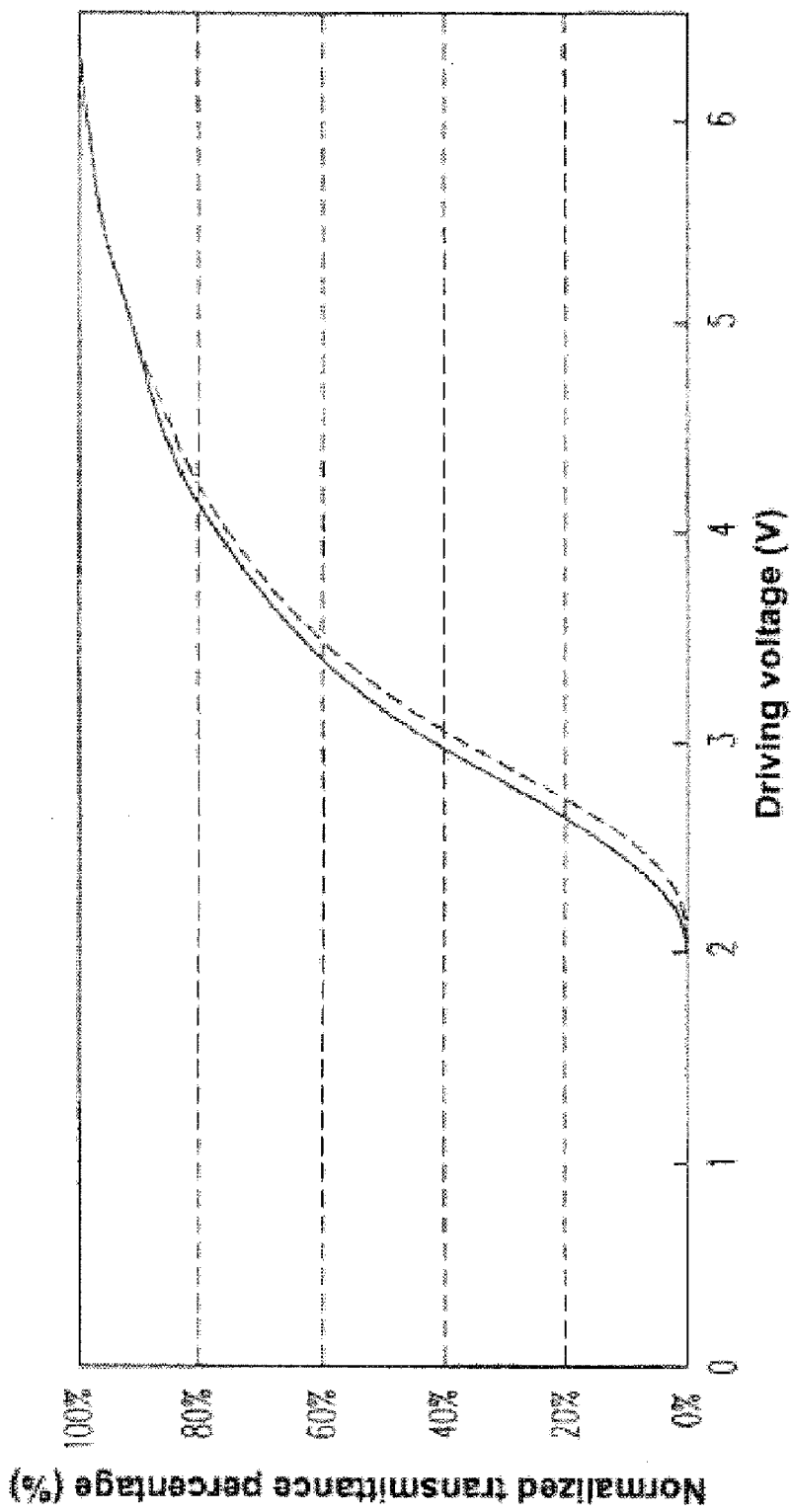
FIG. 6B is a chart of curves representing relationships of voltage to normalized transmittance percentage.

FIG. 6A is a top view of the pixel unit of a sixth embodiment, and FIG. 6B is a graph of curves (for different form factors of slits) representing relationships of driving voltage versus normalized transmittance percentage. The pixel unit 600 includes an active component 1316 and a pixel electrode 6320, wherein the pixel electrode 6320 electrically connects to the active component 1316. Furthermore, the pixel electrode 6320 has a plurality of non-jagged slits 6322 and a plurality of jagged slits 6324, wherein said non-jagged slits 6322 are in a location that corresponds to that of the first domain set I and said jagged slits 6324 are in a location that corresponds to that of the second domain set II.

In FIG. 6B, the horizontal coordinate represents the driving voltage, and the vertical coordinate represents the normalized transmittance percentage. Additionally, the solid line curve represents non-jagged slits and the dashed line curve represents jagged slits. It can be seen from FIG. 6 that with the same driving voltage, an MVA LCD that uses non-jagged slits will have a higher transmittance. In other words, the driving voltage supplied to the liquid crystal layer 1200 portion in the first domain set I and that supplied to the liquid crystal layer 1200 portion in the second domain set II will have different voltage-transmittance characteristics.

Seventh Embodiment

Figure 7A:
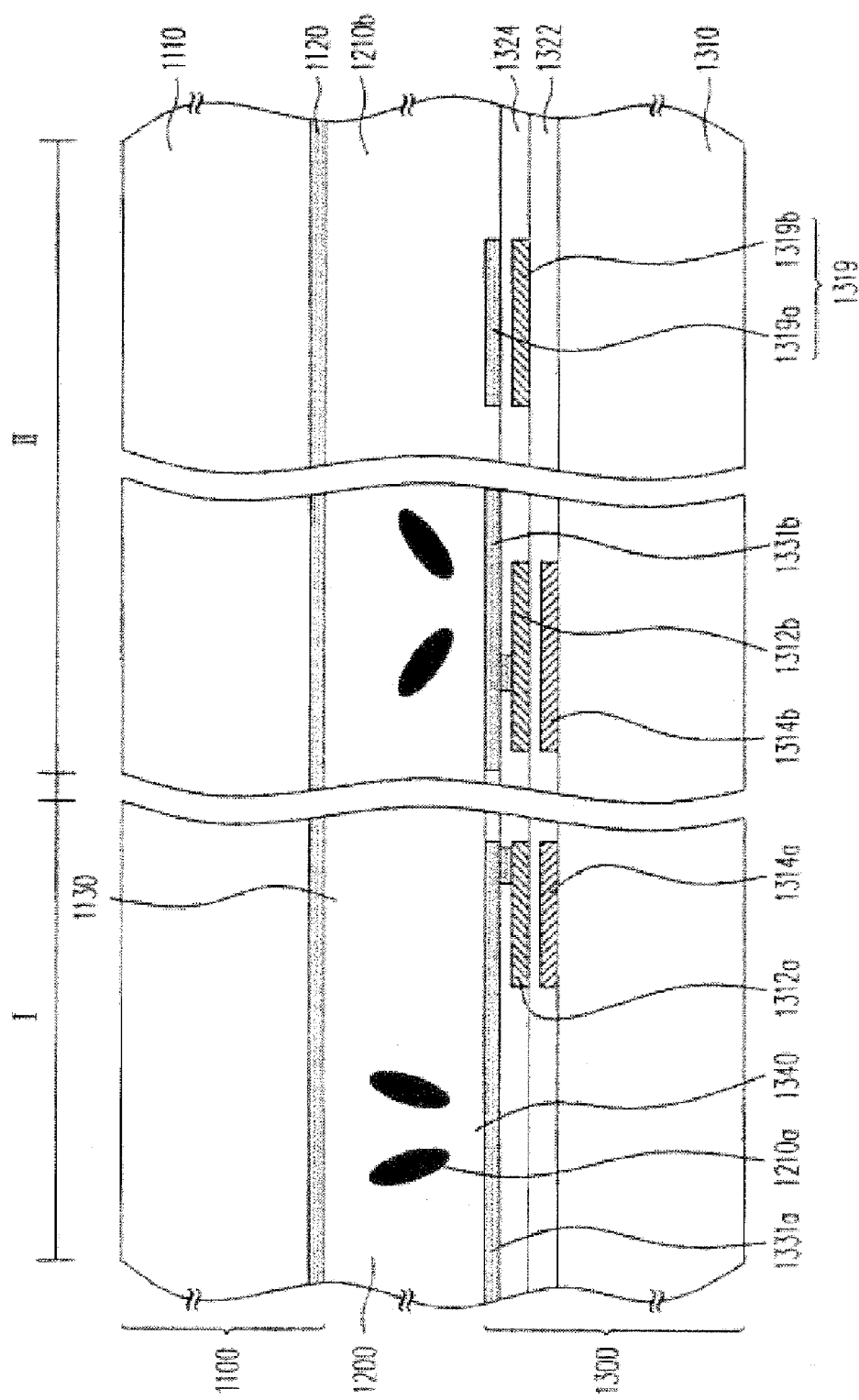
FIG. 7A is a sectional view of a pixel unit of an MVA LCD according to a seventh embodiment.
Figure 7B:
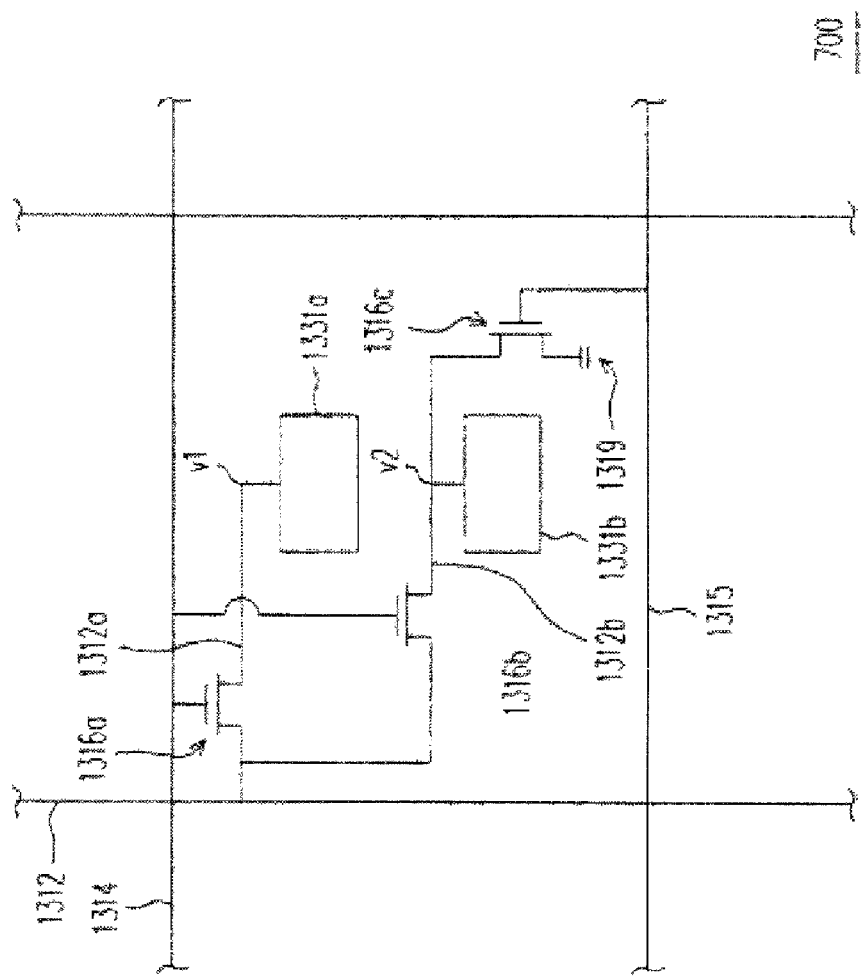
FIG. 7B is a schematic circuit diagram of the pixel unit of the MVA LCD according to the seventh embodiment.

FIG. 7A is a sectional view of a pixel unit 700 of an MVA LCD according to a seventh embodiment, and FIG. 7B is a schematic circuit diagram of the pixel unit 700. The MVA LCD includes an opposite substrate 1100, a liquid crystal layer 1200 portion, and an active component array substrate 1300, wherein the liquid crystal layer 1200 portion is disposed between the active component array substrate 1300 and the opposite substrate 1100. Additionally, the opposite substrate 1100 comprises a first substrate 1110 and a common electrode layer 1120 which is disposed on the surface of the first substrate 1110, wherein the common electrode layer 1120 faces the active component array substrate 1300.

The active component array substrate 1300 has a plurality of data lines 1312, a plurality of scan lines 1314, and a plurality of pixel units 700, wherein the pixel units 700 are controlled by the corresponding data lines 1312 and scan lines 1314 (as shown in FIG. 7B). Additionally, the pixel unit 700 is disposed above a second substrate 1310 and includes a first active component 1316a, a second active component 1316b, a third active component 1316c, a first pixel electrode 1331a, a second pixel electrode 1331b, and a capacitor 1319 (as shown in FIG. 7B). The first active component 1316a, second active component 1316b, and third active component 1316c are each, for example, a thin film transistor or otherwise a three-end active component.

The first active component 1316a electrically connects to the first pixel electrode 1331a and the first pixel electrode 1331a is in a location that corresponds to that of the first domain set I (as shown in FIG. 7A), wherein the first active component 1316a electrically connects to the first pixel electrode 1331a via, for example, its drain 1312a. Additionally, the second active component 1316b electrically connects to the second pixel electrode 1331b and the second pixel electrode 1331b is in a location that corresponds to that of the second domain set II (as shown in FIG. 7A), wherein the second active component 1316b electrically connects to the first pixel electrode 1331a via, for example, its drain 1312b. Note that the drains 1312a (of TFT 1316a) and 1312b (of TFT 1316b) are, for example, formed at the same time with the data line 1312, and gate 1314a of the first active component 1316a and gate 1314b of the second active component 1316a electrically connect to the scan line 1314, separately. The sources of the active components 1316a, 1316b are connected to the data line 1312.

In FIG. 7B, both the first active component 1316a and the second active component 1316b electrically connect to the data line 1312 and scan line 1314 corresponding to the pixel unit 700, while the gate of the third active component 1316c electrically connects to the next scan line 1315, and the capacitor 1319 electrically connects to the second pixel electrode 1331b through the third active component 1316c. The gate of the third active component 1316c electrically connects to the next scan line 1315 so that the scan line 1315 can turn on/off the third active component 1316c. Additionally, the source of the third active component 1316c electrically connects to the second pixel electrode 1331b while the drain of the third active component 1316c electrically connects to an electrode of the capacitor 1319.

In this arrangement, voltage V1 (at pixel electrode 1331a) is the same as voltage V2 (at pixel electrode 1331b) when the first active component 1316a and the second active component 1316b are driven at the same time by the data line 1312 and scan line 1314. However, when the next scan line 1315 is activated to turn on the third active component 1316c, the capacitor 1319 will cause the voltage V2 to drop. At this time, both the first active component 1316a and the second active component 1316b are in the off state. This causes the driving voltage applied on the liquid crystal layer 1200 portion in the first domain set I and that applied on the liquid crystal layer 1200 portion in the second domain set II to have different voltage-transmittance characteristics.

The capacitor 1319 includes a first electrode 1319a and a second electrode 1319b (FIG. 7A), wherein the second electrode 1319b is disposed below the first electrode 1319a, and the first electrode 1319a, the first pixel electrode 1331a and the second pixel electrode 1331b are of the same material, while the second electrode 1319b and the data line 1312 are of the same material.

Eighth Embodiment

Figure 8:
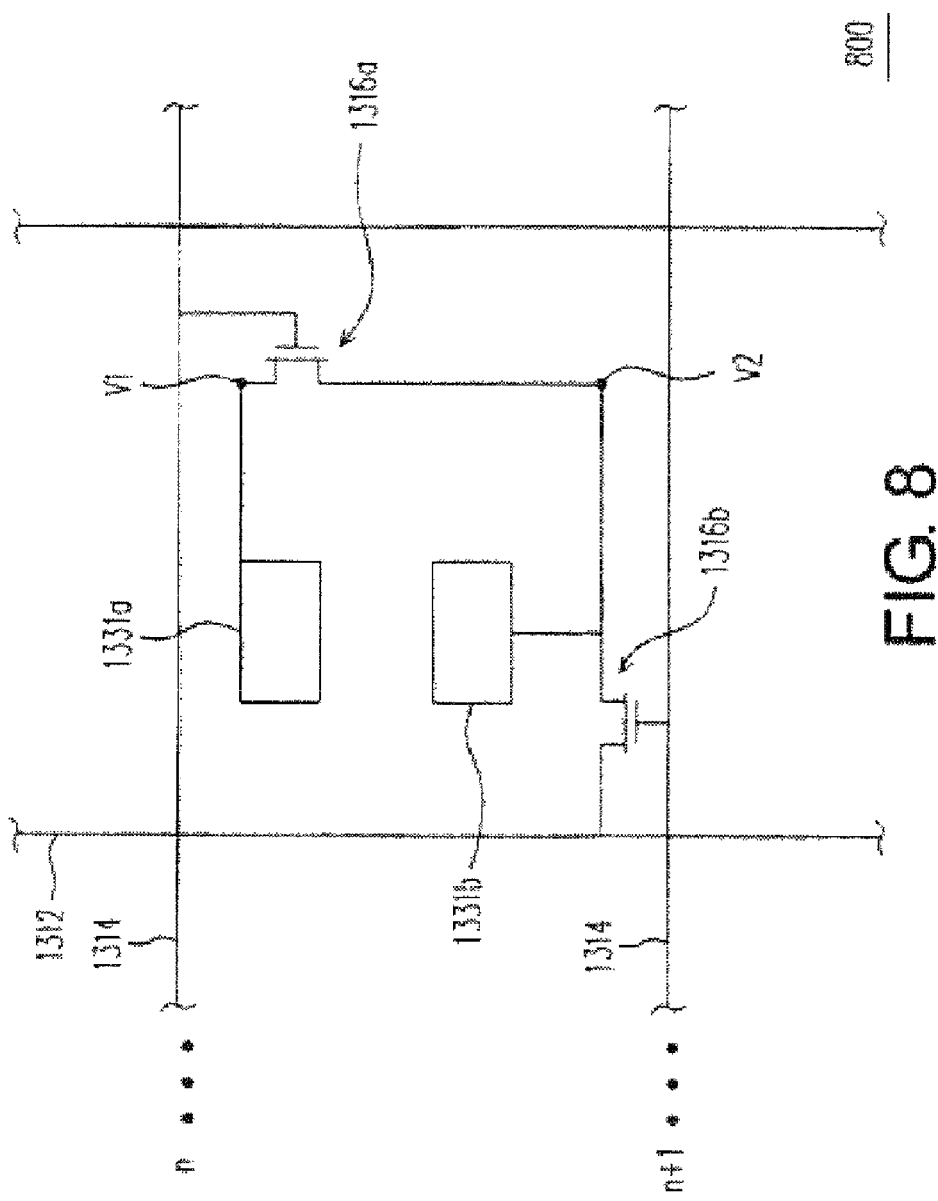
FIG. 8 is a schematic circuit diagram of a pixel unit of an MVA LCD according to an eighth embodiment.

FIG. 8 is a schematic circuit diagram of the pixel unit in an MVA LCD according to an eighth embodiment. In this embodiment, the pixel unit 800 includes a first active component 1316a, a first pixel electrode 1331a, a second active component 1316b, and a second pixel electrode 1331b. The gate of the first active component 1316a electrically connects to the scan line 1314 (the $n^{th}$ line in FIG. 8) corresponding to the pixel unit 800, and the first pixel electrode 1331a electrically connects to the drain of the first active component 1316a. The source of the first active component 1316a is connected to the drain of the second active component 1316b.

Additionally, the first pixel electrode 1331a is in a location that corresponds to that of the first domain set I. The source of the second active component 1316b electrically connects to the data line 1312 corresponding to the pixel unit 800, and the gate of the second active component 1316b electrically connects to the next scan line 1314 (the $n+1^{th}$ line as shown in FIG. 8). The second active component 1316b is turned on or off by the next scan line 1314 (the $n+1^{th}$ line as shown in FIG. 8). Furthermore, the second pixel electrode 1331b is electrically connected to both the second active component 1316b and the first active component 1316a and is in a location that corresponds to that of the second domain set II.

Specifically, when the $n^{th}$ scan line 1314 is activated to turn on the first active component 1316a, the signal voltage of the $(k-1)^{th}$ time frame (previous time frame) retained at the second pixel electrode 1331b will be written to the first pixel electrode 1331a (located in the first domain set I) as voltage V1. Next, when the $(n+1)^{th}$ scan line 1314 activates to turn on the second active component 1316b, the data line 1312 will write the signal voltage of the $k^{th}$ time frame to the second pixel electrode 1331b (located in the second domain set II) as voltage V2. Note that at this time the first active component 1316a is off.

This will cause the liquid crystal molecules disposed in the first domain set I and the second domain set II to receive different effective voltages. In other words, the obliquity of the liquid crystal molecules in these two domain sets (first domain set I and second domain set II) will be different so that the transmittance will differ as well. This enables the two domain sets (I and II) to compensate each other to provide viewers a wider angle of view.

Note that the display quality of an MVA LCD panel according to some embodiments of the invention will be improved by changing the surface area ratio of the first domain set I to the second domain set II in the above embodiments.

In summary, an MVA LCD according to some embodiments may have at least the following features:

I. The MVA LCD has multiple domains, in which the liquid crystal molecules have the same alignment but different obliquity so that changes in brightness due to viewing angle changes will be reduced to improve the display quality.

II. The MVA LCD does not need an additional light shield and is compatible with existing manufacturing facilities.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A multi-domain vertically aligned liquid crystal display device, comprising:
   an active component array substrate having a plurality of pixel units;
   an opposite substrate having a common electrode layer and first alignment structures disposed on said common electrode layer; and
   a liquid crystal layer disposed between said active component array substrate and said opposite substrate,
   wherein said liquid crystal layer proximal each said pixel unit is divided into a first domain set and a second domain set, and each of said first domain set and said second domain set includes plural domains, and each pixel unit includes:
   a thin film transistor;
   a pixel electrode electrically connected to said thin film transistor; and
   second alignment structures disposed on said pixel electrode, wherein each first alignment structure has a minimum first distance and a minimum second distance respectively from said two closest second alignment structures on two opposite sides of the first alignment structure, said minimum first distance and said minimum second distance being different, the minimum first distance differs from the minimum second distance by 1 μm or more.

2. The display device of claim 1, wherein a space between each said first alignment structure and a first of the second alignment structures is in a location that corresponds to the first domain set, and a space between said first alignment structure and a second of the second alignment structures is in a location that corresponds to the second domain set.

3. The display device of claim 1, wherein said first alignment structures are alignment protrusions.

4. The display device of claim 3, wherein said second alignment structures are slits.

5. The display device of claim 1, wherein said first alignment structures are slits.

6. The display device of claim 1, wherein said second alignment structures are alignment protrusions.

7. The display device of claim 1, wherein the first alignment structures and second alignment structures cooperate to arrange liquid crystal molecules in the liquid crystal layer in a multi-domain pattern.

8. A method of forming a multi-domain vertically aligned liquid crystal device, comprising:
    providing an active component array substrate having a plurality of pixel units;
    providing an opposite substrate having a common electrode layer and first alignment structures disposed on said common electrode layer;
    disposing a liquid crystal layer disposed between said active component array substrate and said opposite substrate;
    dividing the liquid crystal layer proximal each pixel unit into a first domain set and a second domain set, and each of the first domain set and the second domain set includes plural domains, and each pixel unit includes:
    a thin film transistor;
    a pixel electrode electrically connected to said thin film transistor; and
    second alignment structures disposed on said pixel electrode, wherein each first alignment structure has a minimum first distance and a minimum second distance respectively from said two closest second alignment structures on two opposite sides of the first alignment structure, said minimum first distance and said minimum second distance being different, the minimum first distance differs from the minimum second distance by 1 μm or more.

9. The method of claim 8, wherein a space between each said first alignment structure and a first of the second alignment structures is in a location that corresponds to the first domain set, and a space between said first alignment structure and a second of the second alignment structures is in a location that corresponds to the second domain set.

10. The method of claim 8, wherein said first alignment structures are alignment protrusions.

11. The method of claim 10, wherein said second alignment structures are slits.

12. The method of claim 8, wherein said first alignment structures are slits.

13. The method of claim 8, wherein said second alignment structures are alignment protrusions.

14. The method of claim 8, wherein the first alignment structures and second alignment structures cooperate to arrange liquid crystal molecules in the liquid crystal layer in a multi-domain pattern.

* * * * *